United States Patent

Taylor

[11] Patent Number: 5,291,782
[45] Date of Patent: Mar. 8, 1994

[54] EDDY CURRENT POSITION SENSOR

[76] Inventor: Howard E. Taylor, 7011-D 301 Blvd., Sarasota, Fla. 34243

[21] Appl. No.: 17,868

[22] Filed: Feb. 16, 1993

[51] Int. Cl.$^5$ .......................... G01F 23/72; G01B 7/14
[52] U.S. Cl. ........................................ 73/319; 73/313; 73/DIG. 5; 324/207.24; 324/207.16
[58] Field of Search ................... 73/313, 319, DIG. 5; 324/207.15, 207.16, 207.24, 204

[56] References Cited

U.S. PATENT DOCUMENTS

| | | | |
|---|---|---|---|
| 3,609,580 | 9/1971 | Thompson et al. | 331/65 |
| 4,008,432 | 2/1977 | Sugisaki et al. | 324/207.16 |
| 4,497,205 | 2/1985 | Zulauf et al. | 73/313 |
| 4,567,762 | 2/1986 | Hoppert et al. | 73/313 |
| 4,627,280 | 12/1986 | Hayashi et al. | 324/207.16 |
| 4,723,446 | 2/1988 | Saito et al. | 73/313 |
| 4,724,705 | 2/1988 | Harris | 73/313 |
| 4,816,759 | 3/1989 | Ames et al. | 324/207.24 |
| 4,950,985 | 8/1990 | Voss et al. | 324/207.24 |

FOREIGN PATENT DOCUMENTS

| | | | |
|---|---|---|---|
| 1025996 | 6/1983 | U.S.S.R. | 324/207.24 |
| 1559091 | 1/1980 | United Kingdom | 324/207.16 |

*Primary Examiner*—Diego F. F. Gutierrez
*Attorney, Agent, or Firm*—Charles J. Prescott

[57] ABSTRACT

An Eddy current position sensor for providing an electrical signal proportional to the position of a metallic ring positioned around and movably positionable axially along the length of an elongated wire wound core. The metallic ring serves as a movable target with respect to the fixed coil/core and may be made buoyant for liquid level measurement or connected to other movable objects. The electrically conductive wire winding around the elongated preferably cylindrical ferromagnetic core has a progressively increasing spacing between each turn of wire from one end of the coil to the other. Each end of the wire is connected to a linear oscillator and signal conversion unit which serves to both input a radio frequency current through the coil and to monitor the absorption of the metallic ring around a conical shaped electromagnet field produced by the energized coil. The field absorption by the metallic ring varies linearly with the axial positioning of the ring over the coil. To increase signal output, an evenly and closely wound "Exciter" portion is also formed around the core of the same length of wire immediately adjacent the closer spaced end of the progressively wound coil.

9 Claims, 2 Drawing Sheets

EDDY CURRENT POSITION SENSOR

BACKGROUND OF THE INVENTION

1. Field of the Invention

This invention relates generally to the field of Eddy current proximity sensors, and more particularly to an Eddy current position sensor having a progressively wound ferromagnetic core to produce a conical shaped electromagnetic field and a linear voltage output.

2. Prior Art

Eddy current or inductive proximity sensors are well known. These sensors typically include a length of conductive wire wound in coil fashion around a non-ferrous core of either air, plastic or ceramic or a ferrite core. The wire coil is electrically energized by a low level radio frequency current to produce an electromagnetic field surrounding the coil/core assembly. This electromagnetic field may be measured by a parameter called "Q" which is a function of the excitation frequency, the inductance of the coil and the resistive losses of the coil.

When a metallic material forming a target is placed within this magnetic field, Eddy currents will be generated on the surface of the target. These Eddy currents absorb energy from the oscillating coil, increasing the energy loss of the coil and reducing the Q of the excited field. Reduction of Q is proportional to the proximity of the metallic target to the coil. Various means have been utilized to accurately and linearly measure the Q of the electromagnetic field and thus the distance between the core and the magnetic target. One such device is disclosed in U.S. Pat. No. 3,609,580 to Thompson, et al. which teaches such an electrical sensing apparatus having an inductive coil and a uniquely configured oscillatory circuit for both exciting and measuring the response of the electromagnetic field produced by proximity of a metallic object to the core.

An automatic liquid level sensor utilizing Eddy current principles is disclosed in U.S. Pat. No. 4,497,205 invented by Zuleuf, et al. This disclosure teaches a magnetic float moving vertically in response to variations in liquid level with respect to an alternating current driven coil. The coil which is located at one end of the float path is driven by a pulse generator thus producing a variable part of the core of the coil. Thus, the device claims to be useable to provide a signal at a predetermined liquid level or an output proportional to the level of the liquid.

Applicant is also aware of two other more distantly related devices, one disclosed in U.S. Pat. No. 4,080,828 invented by Akita which teaches a liquid level detecting apparatus which detects incremental step movements as measured by frequency changes caused by a ring float. The output is not proportional to the positioning of the ring float, however. Clark in U.S. Pat. No. 3,140,608 teaches a liquid level gauge in the form of a capacitance probe using the capacitance of a wire coil on a TEFLON core. Eddy current principles are likewise not employed in this invention.

The concept of linear oscillators is also well-known for use in conjunction with Eddy current proximity sensors. Such circuits are used to provide the radio frequency exciting current to the coil assembly and to provide a measurement of the circuit "Q". In such an arrangement, a constant current is applied to a sensor coil to form a resonant oscillator circuit whose frequency is a function of the coil inductance and the capacitance of a capacitor parallel wired with the coil. The natural frequency of such an oscillator is determined by well-known formula based upon both the inductance of the coil and the capacitance value. Feedback from this oscillator arrangement is provided to a current switch driver which allows the current to the coil to be switched in sync with the oscillator frequency to sustain oscillation. The voltage produced from such an oscillator circuit is a function of the current level passing into the coil, the coil inductance and the "Q" of the coil. As the sensor coil/core approaches a metallic target, the "Q" is reduced.

However, none of the prior art devices above described or otherwise known to applicant produce a linear output signal which is proportional to the axial positioning of a ringed magnetic target surrounding the coil/core. Most of these prior art devices are used as proximity sensors which produce a responsive signal at a predetermined voltage output level. Otherwise, the voltage output is non-linear at best, thus producing irregular and unpredictable target position responses.

The present invention provides a uniquely configured progressively spaced coil wound about a ferromagnetic core which, in combination with a linear oscillator, produces a virtually linear voltage output in response to movement of a magnetic ring positioned about a conical shaped electromagnetic field produced by the elongated coil/core arrangement.

BRIEF SUMMARY OF THE INVENTION

This invention is directed to an Eddy current position sensor for providing an electrical signal proportional to the position of a metallic ring positioned around and movably positionable axially around and along the length of an elongated wire wound core. The magnetic ring serves as a movable target with respect to the fixed coil/core and may be made buoyant for liquid level measurement or connected to other movable objects. The electrically conductive wire winding around the elongated preferably cylindrical ferromagnetic core has a progressively increasing spacing between each turn of wire from one end of the coil to the other. Each end of the wire is connected to a linear oscillator and signal conversion unit which serves to both input a radio frequency current through the coil and to monitor the absorption by the metallic ring target along the axis of the conical shaped electromagnet field produced by the energized coil. The field absorption by the magnetic ring varies linearly with the axial positioning of the ring over the coil. To increase signal output, an evenly and closely wound coil "Exciter" portion is also formed around the core of the same length of wire immediately adjacent the closer spaced end of the progressively wound coil.

It is therefore an object of this invention to provide an Eddy current-type position sensor arrangement which produces a linear voltage output in response to proportional movement of a metallic ring positioned around the elongated coil wound core of the invention.

It is yet another object of this invention to provide a uniquely wound coil-core arrangement for an Eddy current position sensor which incorporates progressively increasing spacing between each turn of the wire wound about the core to form the coil of the invention.

It is yet another object of this invention to provide the above described uniquely configured coil/core which further includes a tightly and uniformly wound Exciter coil portion wound around the core at one end thereof to increase the voltage output and "Q" of the device.

It is yet another object of this invention to provide an Eddy current position sensor having a generally linear voltage output for use in conjunction with the accurate determination of the spacing between the coil and a fixed object and, as well as the liquid level within a reservoir.

In accordance with these and other objects which will become apparent hereinafter, the instant invention will now be described with reference to the accompanying drawings.

DETAILED DESCRIPTION OF THE INVENTION

Figure 1:
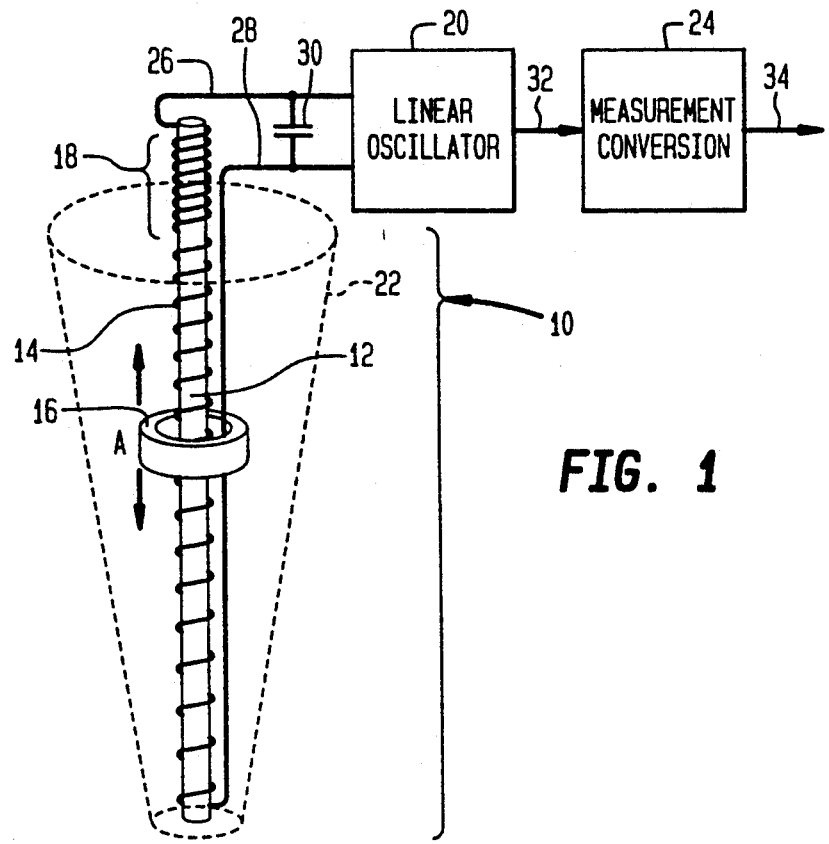
FIG. 1 is a schematic view of one embodiment of the invention.

Referring now to the drawings, and particularly to FIG. 1, one embodiment of the invention is shown generally at numeral 10 structured for use in determining the position of a metallic ring 16 along an elongated, straight cylindrical ferromagnetic core 12 as the metallic ring 16 is moved axially along core 12 in the directions of arrow A.

The ferromagnetic core 12, preferably of uniform cross section therealong, includes a length of electrically conductive wire wound therearound and along a portion of the length thereof at 14. This coil 14 is wound so that each successive turn of the wire 14 is progressively increasingly spaced apart from top to bottom as shown or, viewed conversely, includes an increasing concentration of successive wire turns from bottom to top as shown. A linear oscillator 20 is operably connected at each end 26 and 28 of the length of wire and is structured to induce into the wire a low current level radio frequency signal which excites the proportionally wound coil 14 to produce a generally conically shaped Eddy current field 22 extending about the longitudinal axis of core 12 as shown. A critical part of the present invention, this generally conically shaped electromagnetic field 22 is stronger at the end of the progressively wound coil arrangement 14 wherein the concentration of turns of the wire 14 is greatest.

The linear oscillator 20 inputs a radio frequency alternating current through the coil 14 having a frequency determined by well-known formula based upon the inductance of the coil 14 and the capacitance of parallel wired capacitor 30. The voltage output of this resonant circuit is thus determined by the "Q" of the conically shaped electromagnetic field 22 which, in turn, is effected by the amount of the field absorbed by the magnetic ring 16.

It should be understood at this point that the amount of field absorption by ring 16 is determined by and is proportional to, the strength of the electromagnetic field 22 at the particular position of the magnetic ring 16. Thus, as the ring, without the contacting either the coil 14 or the core 12, is moved axially in the direction of arrow A, a variable amount of electromagnetic field absorption is effected. Because a conical field 22 is produced by the progressively wound coil 14, the voltage output of this circuit, as sensed by the linear oscillator 20 and as amplified by the measurement conversion 24, is an accurate linear predictor of the position of ring 16 with respect to core 12, either of which may be fixed, the other made movable by connection to a target whose position is to be determined.

Figure 2:
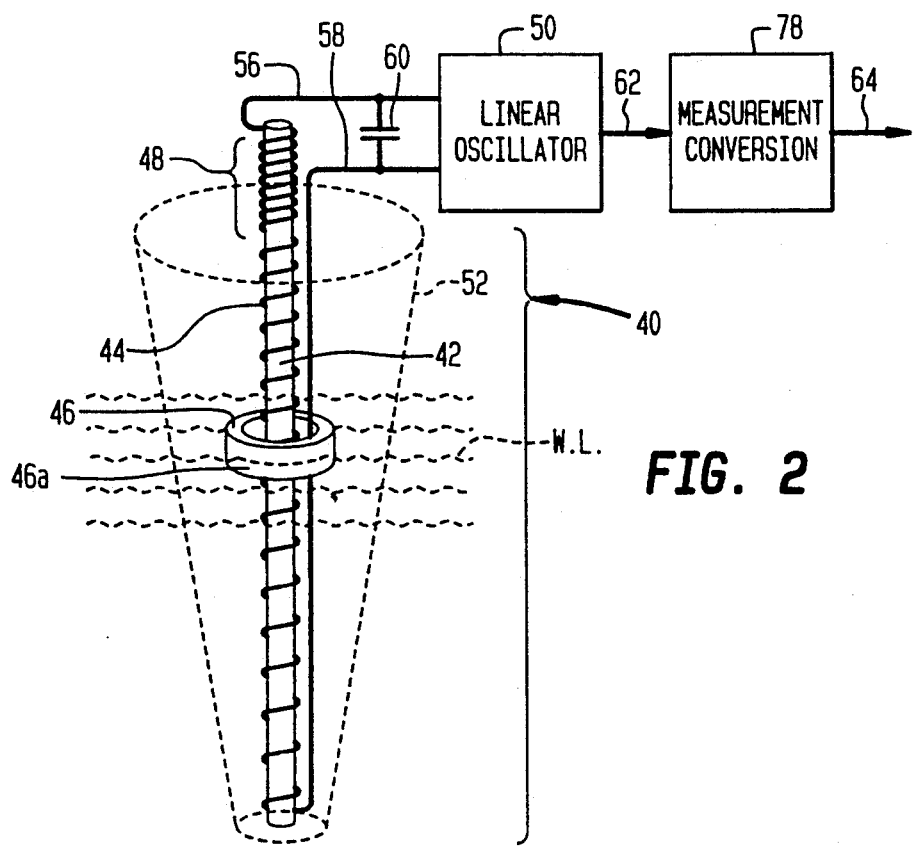
FIG. 2 is a schematic view of another embodiment of the invention.

FIG. 2 depicts a similar arrangement shown generally at numeral 40 including an elongated cylindrical ferromagnetic core 42 about which is progressively wound a length of electrically conductive wire into a coil 44. Each end 56 and 58 of the lengths of wire are operably connected to a linear oscillator 50. Here again, the size of parallel wired capacitor 60, in combination with the inductance of coil 44, determine the resonant frequency of this circuit in a well-known manner. Note, however, that the capacitor 30 and 60, although preferred, is not a necessary requirement for the sensor to be operational. Equal performance may be obtained by driving the coil from a fixed frequency oscillator.

In this embodiment 40, the movable metallic ring 46 is made buoyant by floatable portion 46a so that ring 46 is movable along the stationary core 42 in response to variations in the liquid level WL of a body or tank of liquid. Signal output at 62 is amplified by measurement conversion unit 78 to produce a signal output 64 which is, again linearly proportional to the vertical positioning of metallic ring 46.

Each of the embodiments 10 and 40 also preferably include an "Exciter" portion 18 and 48 of coil 14 and 44, respectively, which is uniformly and tightly wound about core 12 and 42, respectively and positioned at the end of the progressive coil portion 14 and 44 which includes the more closely spaced progressive turns of coil. These exciter coil portions 18 and 48 are provided having uniform close spacing between each of the wire coils therein to boost or increase the voltage and "Q" output of the resonant coil arrangement. It has been found experimentally that, although the pure form of the invention, which includes only the progressively wound coil 14 and 44 as previously described, in combination with conventional voltage measuring arrangements, produces a readable linear voltage output 34 and 64, a voltage boost which is provided by these exciter coil portions 18 and 48 is desirable.

Figure 3:
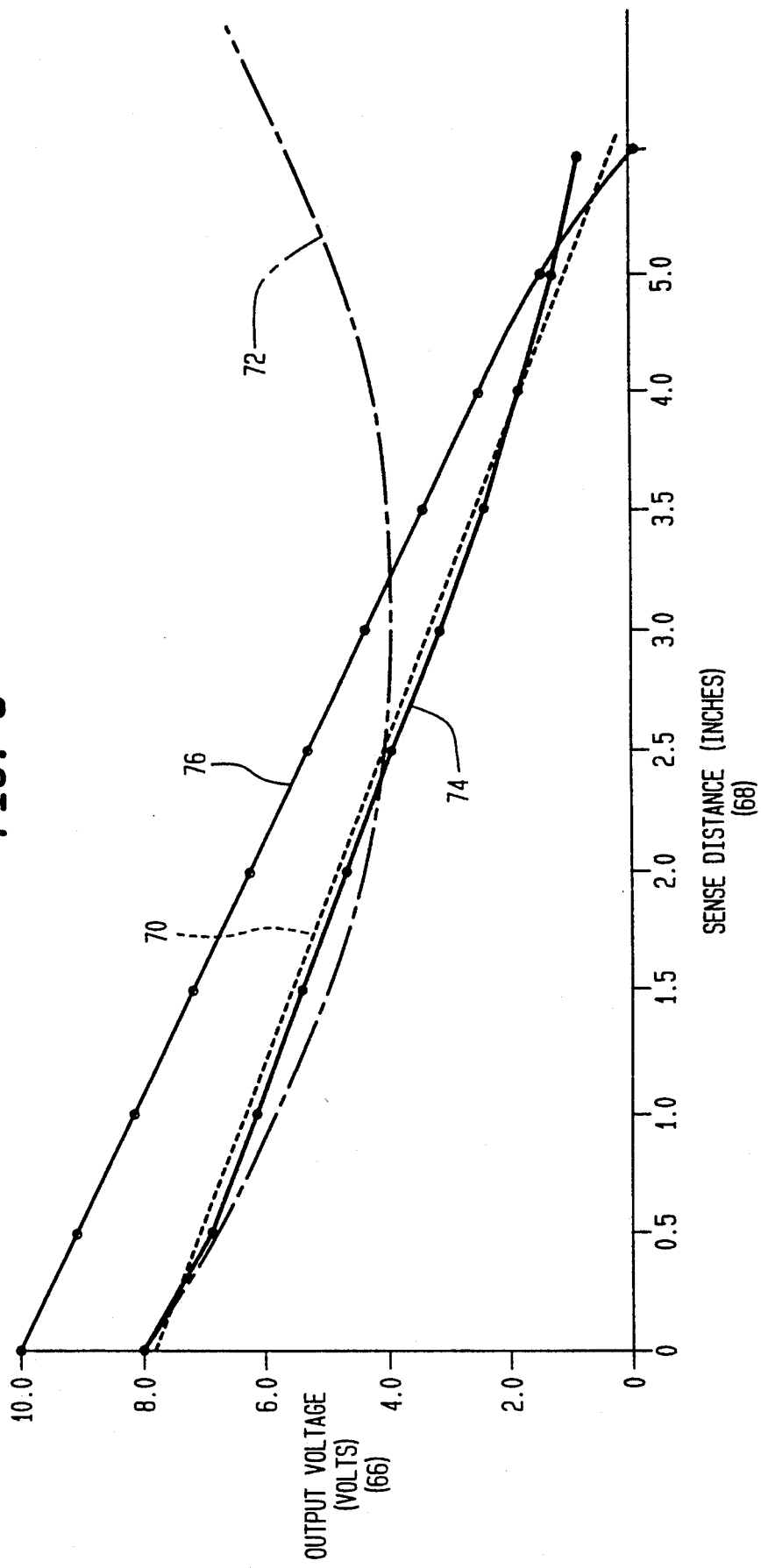
FIG. 3 is an x-y graph depicting comparative voltage outputs of both the invention and a conventional prior art device.

Turning to FIG. 3, the results of experimental testing of the present invention is there shown. A typical ideal or linear response of such a device in the relation of target distance 68 versus output voltage of the circuit 66 is shown at 70. Obviously, a true linear response is very desirable as it obviates the need for a programmable microprocessor which would convert a non-linear voltage output through conversion software to produce a more accurate and predictable measurement of the positioning of the target or magnetic ring 16 or 46 along the length of the core 12 or 42, respectively.

A conventionally wound evenly spaced coil formed about a ferrite cylindrical core was constructed by applicant and then evaluated. The output results are shown at curve 72 in FIG. 3. It is obvious that the output of such a conventionally wound sensor is not only non-linear but also produces the same output voltage for two different positions of the magnetic ring about the core. Even conversion software cannot remedy this situation.

FIG. 3 also depicts the results of the testing of two embodiments of the invention shown at curves 74 and 76. The first curve 74 is of an embodiment of the invention which includes only a progressively wound coil as previously described, while curve 76 depicts the effectiveness of the additional exciter coil portion 18 and 48 as previously described.

In the experiment, approximately fifty turns of 0.024 inch diameter wire wound about a six inch long ferrite core having a 0.25 diameter. The coil assembly was connected to a standard CATEC model PSQ-4 linear proximity control module. The steel ring was constructed having an inside diameter of 0.375 inches, an outside diameter of 0.50 inches and a length of 0.25 inches.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An Eddy current position sensor comprising:
an elongated ferromagnetic core;
an electrically conductive wire coil wound around said core along a portion of the length of said core;
said wire coil having a progressively increasing spacing between each turn of said wire coil along said core from one end of said wire coil to the other end thereof;
each end of said wire coil operably connected to a linear oscillator structured to provide a radio frequency exciting current through said wire coil producing a generally conical electromagnetic field along the length of said wire coil;
a metallic ring positioned around, but not in contact with, said core and movable along the length of said core;
said linear oscillator also structured for sensing and producing an electrical signal proportional to an amount of absorption of said electromagnetic field by said ring;
said electrical signal being proportional to the position of said ring along said core;
said wire coil includes an exciter portion having uniform close spacing between each turn of said wire coil along said exciter portion wherein the overall strength of the electromagnetic field is increased; and
said exciter portion positioned immediately adjacent an end of said progressively increasing spacing of said wire coil.

2. An Eddy current position sensor as set forth in claim 1, wherein:
said ring is buoyant and said core being held upright with a lower portion thereof immersed into a liquid, said ring buoyantly movable along the length of said core in response to variations in the level of the liquid.

3. An Eddy current position sensor as set forth in claim 1, further comprising:
a capacitor connected in parallel with said coil between an input and an output terminal of said linear oscillator for establishing the oscillating frequency of said alternating current.

4. An Eddy current position sensor comprising:
an elongated straight ferromagnetic core having a uniform cross section therealong;
a length of electrically conductive wire wound around said core into a coil along a portion of the length of said core;
said wire coil having a progressively increasing concentration of spaced turns of said wire around said core;
a metallic ring positioned concentrically around, but not in contact with, said core for free axial movement along the length of said core and said coil;
a linear oscillator operably connected to each end of said wire structured to electrically energize said coil to produce a generally uniform conical shaped electromagnetic field along the length of said coil, said linear oscillator also structured to produce an output signal proportional to the amount of electromagnetic field absorption by said ring;
said wire coil includes an exciter portion having uniform close spacing between each turn of said wire coil along said exciter portion wherein the overall strength of the electromagnetic field is increased; and
said exciter portion positioned immediately adjacent an end of said progressively increasing spacing of said wire coil.

5. An Eddy current position sensor as set forth in claim 4, wherein:
said ring is buoyant and said core being held upright with a lower portion thereof immersed into a liquid, said ring buoyantly movable along the length of said core in response to variations in the level of the liquid.

6. An Eddy current position sensor as set forth in claim 4, further comprising:
a capacitor connected in parallel with said coil between an input and an output terminal of said linear oscillator for establishing a natural oscillating frequency for electrically energizing said coil.

7. An Eddy current position sensor comprising:
an elongated straight ferromagnetic core having a uniform cross section therealong;
a length of electrically conductive wire wound around said core into a coil along a portion of the length of said core;
said wire coil having a progressively increasing concentration of spaced turns of said wire around said core;
a metallic ring positioned concentrically around, but not in contact with, said core for free axial movement along the length of said core and said coil;
oscillating means for applying an alternating current through said coil to produce a generally uniform conical shaped electromagnetic field along the length of said coil;
monitoring means for measuring variations in the strength of said electromagnetic field;
said wire coil includes an exciter portion having uniform close spacing between each turn of said wire coil along said exciter portion wherein the overall strength of the electromagnetic field is increased; and
said exciter portion positioned immediately adjacent an end of said progressively increasing spacing of said wire coil.

8. An Eddy current position sensor as set forth in claim 7, wherein:
said ring is buoyant and said core being held upright with a lower portion thereof immersed into a liquid, said ring buoyantly movable along the length of said core in response to variations in the level of the liquid.

9. An Eddy current position sensor as set forth in claim 7, further comprising:

a capacitor connected in parallel with said coil between an input and an output terminal of said linear oscillator for establishing a natural oscillating frequency of said alternating current.

* * * * *